United States Patent
Matsushita et al.

(10) Patent No.: US 11,091,576 B2
(45) Date of Patent: Aug. 17, 2021

(54) ACTIVE ENERGY RAY-CURABLE COMPOSITION, ACTIVE ENERGY RAY-CURABLE INKJET INK, COMPOSITION STORAGE CONTAINER, INKJET DISCHARGING APPARATUS, AND CURED PRODUCT

(71) Applicant: RICOH COMPANY, LTD., Tokyo (JP)

(72) Inventors: Yuuki Matsushita, Kanagawa (JP); Satoshi Kojima, Kanagawa (JP); Takayuki Shimizu, Kanagawa (JP); Shin Hasegawa, Tokyo (JP); Hiroki Kobayashi, Kanagawa (JP); Yukiko Ishijima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/744,373

(22) Filed: Jan. 16, 2020

(65) Prior Publication Data

US 2020/0231725 A1    Jul. 23, 2020

(30) Foreign Application Priority Data

Jan. 22, 2019 (JP) ............... JP2019-008715

(51) Int. Cl.
*C08F 220/18* (2006.01)
*C08K 5/5397* (2006.01)
*C09D 11/322* (2014.01)
*C09D 11/38* (2014.01)

(52) U.S. Cl.
CPC ...... *C08F 220/1811* (2020.02); *C08K 5/5397* (2013.01); *C09D 11/322* (2013.01); *C09D 11/38* (2013.01)

(58) Field of Classification Search
CPC ... C08F 220/1811; C09D 11/30; C09D 11/32; C09D 11/322; C09D 11/38
See application file for complete search history.

(56) References Cited

U.S. PATENT DOCUMENTS

| | | | |
|---|---|---|---|
| 2013/0002773 A1* | 1/2013 | Fujii | C09D 7/80 347/86 |
| 2015/0361284 A1* | 12/2015 | Herlihy | C08F 220/30 522/18 |
| 2017/0066250 A1* | 3/2017 | Ikeda | B41J 2/175 |
| 2017/0253680 A1 | 9/2017 | Yamada | |
| 2017/0260405 A1 | 9/2017 | Kumai et al. | |
| 2017/0267879 A1 | 9/2017 | Kohzuki et al. | |
| 2017/0327705 A1 | 11/2017 | Yamada | |
| 2018/0170061 A1 | 6/2018 | Nakamura et al. | |
| 2018/0208783 A1 | 7/2018 | Takahashi et al. | |
| 2018/0333909 A1 | 11/2018 | Arita et al. | |
| 2019/0023924 A1 | 1/2019 | Yamada | |
| 2019/0100667 A1 | 4/2019 | Miyaake et al. | |
| 2019/0144697 A1* | 5/2019 | Saito | C09D 11/38 106/31.78 |
| 2019/0256727 A1 | 8/2019 | Kumai et al. | |
| 2019/0270901 A1 | 9/2019 | Fujii et al. | |
| 2019/0270903 A1 | 9/2019 | Kohzuki et al. | |
| 2019/0284416 A1 | 9/2019 | Asami et al. | |
| 2019/0300731 A1 | 10/2019 | Nagashima et al. | |

FOREIGN PATENT DOCUMENTS

| | | |
|---|---|---|
| JP | 2012-201847 | 10/2012 |
| JP | 2016-183344 | 10/2016 |
| JP | 2018-154766 | 10/2018 |

OTHER PUBLICATIONS

U.S. Appl. No. 16/458,464, filed Jul. 1, 2019, Takao Hiraoka, et al.

* cited by examiner

*Primary Examiner* — Robert C Boyle
(74) *Attorney, Agent, or Firm* — Oblon, McClelland, Maier & Neustadt, L.L.P.

(57) ABSTRACT

An active energy ray-curable composition is provided. The active energy ray-curable composition comprises a polymerizable compound and a polymerization initiator. The polymerizable compound comprises isobornyl acrylate. The active energy ray-curable composition gives, when centrifuged with a centrifugal force of $8 \times 10^6$ g, a supernatant with an absorbance at a wavelength of 700 nm of 0.02 or lower.

12 Claims, 4 Drawing Sheets

ACTIVE ENERGY RAY-CURABLE COMPOSITION, ACTIVE ENERGY RAY-CURABLE INKJET INK, COMPOSITION STORAGE CONTAINER, INKJET DISCHARGING APPARATUS, AND CURED PRODUCT

CROSS-REFERENCE TO RELATED APPLICATIONS

This patent application is based on and claims priority pursuant to 35 U.S.C. § 119(a) to Japanese Patent Application No. 2019-008715, filed on Jan. 22, 2019, in the Japan Patent Office, the entire disclosure of which is incorporated by reference herein.

BACKGROUND

Technical Field

Embodiments of this disclosure relate to an active energy ray-curable composition, an active energy ray-curable inkjet ink, a composition storage container, an inkjet discharging apparatus, and a cured product.

Description of the Related Art

Inkjet recording methods are known as methods for forming an image on a recording medium such as paper. These inkjet recording methods have high ink consumption efficiency and excellent resource-saving property, and make it possible to reduce an ink cost per a recording unit.

In recent years, inkjet recording methods using an active energy ray-curable inkjet ink have been attracting attention. When an active energy ray-curable inkjet ink is used for inkjet recording, the ink charged in the print head or the like is generally discharged from a nozzle.

In ink preparation, raw materials are mixed, stirred, and then filtered to prepare ink. In processes of mixing and stirring the raw materials, if the raw materials contain many impurities, the impurities are not thoroughly removed even by the subsequent filtration in some cases. It is known that these remaining impurities in the ink spoil discharge stability. Thus, it is required to consider not only quality of the ink but also solubility of a polymerizable monomer, an acrylic monomer for instance, and a powder raw material to each other. A general acrylic monomer, isobornyl acrylate, can improve an image quality from the viewpoint of wettability.

As described above, it is useful to add an isobornyl acrylate for the purpose of improving the image quality, but if impurities are contained in a large amount, discharge stability is decreased. In addition, it is required to add a large amount of polymerization initiator for improving curability of the ink, but in this case, the polymerization initiator is not dissolved in the ink depending on the addition amount, resulting in a decrease in discharge stability.

SUMMARY

In accordance with some embodiments of the present invention, an active energy ray-curable composition is provided. The active energy ray-curable composition comprises a polymerizable compound and a polymerization initiator. The polymerizable compound comprises isobornyl acrylate. The active energy ray-curable composition gives, when centrifuged with a centrifugal force of $8\times10^6$ g, a supernatant with an absorbance at a wavelength of 700 nm of 0.02 or lower.

BRIEF DESCRIPTION OF THE DRAWINGS

The aforementioned and other aspects, features, and advantages of the present disclosure would be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

According to an embodiment of the present invention, an active energy ray-curable composition is provided that exhibits excellent image quality and curability, and high discharge stability.

Hereinafter, an active energy ray-curable composition, an active energy ray-curable inkjet ink, a composition storage container, an inkjet discharging apparatus, and a cured product according to some embodiments of the present invention will be explained. Note that the present invention is not limited to the following embodiments, and can be modified within a range of conception for those skilled in the art, including other embodiments, addition, revision, deletion, and the like. In any aspect, the modifications are included in the scope of the present invention as long as the modifications generate actions and effects of the present invention.

<Polymerizable Compound>

The active energy ray-curable composition according to an embodiment of the present invention contains a polymerizable compound (monomer) as a curable component. Examples of the polymerizable compound include, but are not limited to, the following monofunctional monomers. In addition, these polymerizable compounds may be used in combination, if required.

Examples of the polymerizable compound include phenoxyethyl acrylate, tetrahydrofurfuryl acrylate, isobornyl acrylate, 2-hydroxyethyl acrylate, 4-hydroxybutyl acrylate, isobutyl acrylate, t-butyl acrylate, isooctyl acrylate, 2-methoxyethyl acrylate, methoxytriethyleneglycol acrylate, 2-ethoxyethyl acrylate, 3-methoxybutyl acrylate, ethoxyethyl acrylate, butoxyethyl acrylate, ethoxydiethyleneglycol acrylate, 2-hydroxyethyl acrylate, ethyldiglycol acrylate, cyclic trimethylolpropaneformal monoacrylate, imide acrylate, isoamyl acrylate, ethoxylated succinic acid acrylate, trifluoroethyl acrylate, ω-carboxypolycaprolactone monoacrylate, benzyl acrylate, methylphenoxyethyl acrylate, cyclohexyl acrylate, 4-t-butylcyclohexyl acrylate, caprolactone-modified tetrahydrofurfuryl acrylate, tribromophenyl acrylate, ethoxylated tribromophenyl acrylate, 2-phenoxyethyl acrylate, acryloylmorpholine, phenoxydiethyleneglycol acrylate, 2-hydroxy-3-phenoxypropyl acrylate, 1,4-cyclohexanedimethanol monoacrylate, 2-(2-ethoxyethoxy)ethyl acrylate, stearyl acrylate, diethyleneglycolmonobutylether acrylate, lauryl acrylate, isodecyl acrylate, 3,3,5-trimethylcyclohexanol acrylate, isooctyl acrylate, octyl/decyl acrylate, tridecyl acrylate, caprolactone acrylate, ethoxylated (4) nonylphenol acrylate, methoxypolyethyleneglycol (350) monoacrylate, methoxypolyethyleneglycol (550) monoacrylate, N-vinylformamide, N-vinylcaprolactam, and vinylpyrrolidone.

Above all, the isobornyl acrylate is used as the polymerizable compound in the present disclosure, for improving the image quality. In the active energy ray-curable composition according to an embodiment of the present invention, a proportion of the isobornyl acrylate is preferably 1% to 30% by mass, more preferably 1% to 25% by mass, most preferably 1% to 20% by mass for dischargeability and adhesiveness.

<Multifunctional (Meth)Acrylate Compound>

In the present disclosure, in addition to the aforementioned monofunctional monomers, a polyfunctional monomer having two or more ethylenically unsaturated double bonds can be used. Examples of the polyfunctional monomer include, but are not limited to, trimethylolpropane triacrylate, pentaerythritol triacrylate, pentaerythritol tetraacrylate, ethyleneglycol di acrylate, polyethyleneglycol diacrylate, tetraethyleneglycol diacrylate, dipropyleneglycol diacrylate, tripropyleneglycol triacrylate, polypropyleneglycol diacrylate, neopentylglycol diacrylate, bis-dipentaerythritol hexaacrylate, diethyleneglycol di acrylate, 1,6-hexanediol diacrylate, ethoxylated-1,6-hexanediol diacrylate, 1,4-butanediol diacrylate, 1,9-nonanediol diacrylate, 2-n-butyl-2-ethyl-1,3-propanediol diacrylate, hydroxypivalic acid neopentylglycol diacrylate, hydroxypivalic acid trimethylolpropane triacrylate, 1,3-butyleneglycol di(meth)acrylate, ethoxylated phosphoric acid triacrylate, ethoxylated tripropyleneglycol di acrylate, neopentylglycol-modified trimethylolpropane di acrylate, stearic acid-modified pentaerythritol diacrylate, tetramethylolmethane triacrylate, tetramethylolmethane tetraacrylate, tetramethylolpropane triacrylate, caprolactone-modified trimethylolpropane triacrylate, propoxylate glyceryl triacrylate, ditrimethylolpropane tetraacrylate, ethoxylated pentaerythritol tetraacrylate, dipentaerythritol hexaacrylate, caprolactone-modified dipentaerythritol hexaacrylate, dipentaerythritol hydroxypentaacrylate, neopentylglycol oligoacrylate, 1,4-butanediol oligoacrylate, 1,6-hexanediol oligoacrylate, trimethylolpropane oligoacrylate, pentaerythritol oligoacrylate, ethoxylated neopentylglycol di(meth)acrylate, propoxylated neopentylglycol di(meth)acrylate, tripropyleneglycol di(meth)acrylate, ethoxylated trimethylolpropane triacrylate, and propoxylated trim ethyl olpropane tri acrylate.

These multifunctional monomers may be used in combination, if required.

A proportion of the polyfunctional monomers in combination with polyfunctional oligomers described later to the whole active energy ray-curable composition is, for instance, 0.01% to 20% by mass, preferably 5.0% to 15.0% by mass. As long as the proportion is within the above range, a cured product having both adhesiveness and viscosity suitable for the inkjet can be obtained.

<Oligomer>

In the present disclosure, in addition to the monofunctional monomer, an oligomer having an ethylenically unsaturated double bond can be used. Examples of the oligomer include an aromatic urethane oligomer, an aliphatic urethane oligomer, an epoxyacrylate oligomer, a polyester acrylate oligomer, and other special oligomers.

Examples of commercially available products of the oligomer include UV-2000B, UV-2750B, UV-3000B, UV-3010B, UV-3200B, UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 manufactured by The Nippon Synthetic Chemical Industry Co., Ltd.; CN902, CN902J75, CN929, CN940, CN944, CN944B85, CN959, CN961E75, CN961H81, CN962, CN963, CN963A80, CN963B80, CN963E75, CN963E80, CN963J85, CN964, CN965, CN965A80, CN966, CN966A80, CN966B85, CN966H90, CN966J75, CN968, CN969, CN970, CN970A60, CN970E60, CN971, CN971A80, CN971J75, CN972, CN973, CN973A80, CN973H85, CN973J75, CN975, CN977, CN977C70, CN978, CN980, CN981, CN981A75, CN981B88, CN982, CN982A75, CN982B88, CN982E75, CN983, CN984, CN985, CN985B88, CN986, CN989, CN991, CN992, CN994, CN996, CN997, CN999, CN9001, CN9002, CN9004, CN9005, CN9006, CN9007, CN9008, CN9009, CN9010, CN9011, CN9013, CN9018, CN9019, CN9024, CN9025, CN9026, CN9028, CN9029, CN9030, CN9060, CN9165, CN9167, CN9178, CN9290, CN9782, CN9783, CN9788, and CN9893 manufactured by Sartomer Company, Inc.; and EBECRYL210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 manufactured by Daicel-Cytec Co., Ltd. These products can also be used in combination.

Also, oligomers obtained by synthesis can be used alone or in combination.

Among the oligomers, a proportion of an oligomer having two or more ethylenically unsaturated bonds to the whole active energy ray-curable composition is preferably 0.01% to 15.0% by mass, more preferably 1.0% to 10.0% by. As long as the proportion is within a range of 0.01% to 15.0% by mass, a cured product having both adhesiveness and good dischargeability can be obtained.

<Curing Device>

Examples of a device for curing the curable composition according to an embodiment of the present invention include devices for thermal curing and for curing with active energy rays, and above all, a device for curing with active energy rays is preferable.

<Active Energy Ray>

An active energy ray used for curing the active energy ray-curable composition according to an embodiment of the present invention may be an ultraviolet ray, as well as any rays capable of providing energies required for enhancing polymerization reaction of a polymerizable component in the composition, such as an electron ray, an α-ray, a β-ray, a γ-ray, and an X-ray, and is not particularly limited. Particularly when a high energy light source is used, polymerization reaction can be enhanced without using a polymerization initiator. Additionally, in the case of ultraviolet irradiation, mercury-free ultraviolet irradiation is eagerly desired from the viewpoint of environmental protection, and replacement with a GaN-based semiconductor ultraviolet light-emitting device is industrially and environmentally very useful. Furthermore, ultraviolet light-emitting diode (UV-LED) and ultraviolet laser diode (UV-LD) are preferable as an ultraviolet light source because of small size, long life, high efficiency and low cost.

<Polymerization Initiator>

The active energy ray-curable composition according to an embodiment of the present invention may contain a polymerization initiator. The polymerization initiator may be any polymerization initiator which can produce active species such as radicals or cations by energy of the active energy ray and initiate polymerization of polymerizable compounds (monomers and oligomers). As such a polymerization initiator, a known radical polymerization initiator, cationic polymerization initiator, base producing agent, and the like can be used alone or in combination, and above all, the radical polymerization initiator is preferably used. In addition, a proportion of the polymerization initiator to the total mass (100% by mass) of the composition is preferably 0.1% to 20% by mass for obtaining a sufficient curing speed.

Examples of the radical polymerization initiator include an aromatic ketone, an acylphosphine oxide compound, an aromatic onium salt compound, an organic peroxide, a thio compound (such as thioxanthone compound and thiophenyl group-containing compound), a hexaaryl biimidazole compound, a ketoxime ester compound, a borate compound, an azinium compound, a metallocene compound, an active ester compound, a compound having a carbon-halogen bond, and an alkylamine compound.

In addition to the above polymerization initiators, a polymerization accelerator (sensitizer) can be used in combination. The polymerization accelerator is not particularly limited, and is preferably exemplified by an amine compound such as trimethylamine, methyldimethylamine, triethanolamine, p-diethylaminoacetophenone, p-dimethylaminobenzoic acid ethyl, p-dimethylaminobenzoic acid-2-ethylhexyl, N,N-dimethylbenzylamine, and 4,4'-bis(diethylamino)benzophenone. A content of the polymerization initiator may be appropriately set depending on a type and an amount of a polymerization initiator to be used.

Above all, the polymerization initiator is preferably the acylphosphine oxide compound, more preferably a phenyl-bis (2,4,6-trimethylbenzoyl) phosphine oxide for further improving image quality, curability, and discharge stability.

More preferably, a proportion of the polymerization initiator in the active energy ray-curable composition according to an embodiment of the present invention is 0.1% to 5% by mass.

<Colorant>

The active energy ray-curable composition according to an embodiment of the present invention may contain a colorant. As the colorant, various pigments and dyes providing black, white, magenta, cyan, yellow, green, orange, glossy colors such as gold and silver, and the like can be used depending on the purpose and requisite properties of the composition according to an embodiment of the present invention. A content of the colorant may be appropriately determined in consideration of a desired color density, dispersibility in the composition, and the like, and therefore is not particularly limited. However, the proportion of the colorant to the total mass (100% by mass) of the composition is preferably 0.1% to 20% by mass. Incidentally, the active energy ray-curable composition according to an embodiment of the present invention may be colorless and transparent without colorants. In that case, the inventive composition is suitable for an overcoat layer for protecting images, for instance.

As the pigment, an inorganic pigment or an organic pigment can be used, and may be used alone or in combination.

As the inorganic pigment, a carbon black (C. I., pigment black 7), such as furnace black, lamp black, acetylene black, and channel black, as well as iron oxide and titanium oxide can be used.

Examples of the organic pigment include an azo pigment such as an insoluble azo pigment, a condensed azo pigment, an azo lake, and a chelate azo pigment; a polycyclic pigment such as a phthalocyanine pigment, perylene and perynone pigments, an anthraquinone pigment, a quinacridone pigment, a dioxane pigment, a thioindigo pigment, an isoindolinone pigment, and a quinophthalone pigment; a dye chelate (e.g., a basic dye-type chelate, an acidic dye-type chelate); a lake pigment (a basic dye-type lake, an acidic dye-type lake); a nitro pigment; a nitroso pigment; an aniline black, and a daylight fluorescent pigment.

Furthermore, a dispersant may be contained for further improving dispersibility of the pigment.

The dispersant is not particularly limited, but can be exemplified by a dispersant conventionally used for preparing a pigment dispersion, such as a polymer dispersant.

As the dye, an acidic dye, a direct dye, a reactive dye, and a basic dye can be used, and may be used alone or in combination.

<Organic Solvent>

The active energy ray-curable composition according to an embodiment of the present invention may contain an organic solvent, but it is preferable that the composition contains no organic solvent if possible. If the composition is free from an organic solvent, especially a volatile organic solvent (VOC (volatile organic compound) free), safety of a place where the composition is handled can be further improved, and also environmental pollution can be prevented. The term "organic solvent" refers to a general non-reactive organic solvent such as ether, ketone, xylene, ethyl acetate, cyclohexanone, and toluene, and should be distinguished from a reactive monomer. In addition, the "free from" an organic solvent refers to that the organic solvent is not substantially contained, and a proportion of the organic solvent in the composition is preferably less than 0.1% by mass.

<Other Components>

The active energy ray-curable composition according to an embodiment of the present invention may contain other known components if required. The other components are not particularly limited, but examples of the components include conventionally known surfactants, polymerization inhibitors, leveling agents, antifoaming agents, fluorescent whitening agents, permeation promoters, wetting agents (moisturizer), fixers, viscosity stabilizers, antifungal agents, antiseptic agents, antioxidants, ultraviolet absorbers, chelating agents, pH conditioners, and thickeners.

<Polymerization Inhibitor>

When the active energy ray-curable composition according to an embodiment of the present invention is used as an active energy ray-curable inkjet ink, the active energy ray-curable composition preferably further contains a polymerization inhibitor. Inclusion of the polymerization inhibitor makes it possible to suppress polymerization reaction even if a low-viscosity monomer volatilizes, and thus improve discharge reliability.

Examples of the polymerization inhibitor include 4-methoxy-1-naphthol, methylhydroquinone, hydroquinone, t-butylhydroquinone, di-t-butylhydroquinone, methoquinone, 2,2'-dihydroxy-3,3'-di($\alpha$-methylcyclohexyl)-5,5'-dimethylphenylmethane, p-benzoquinone, di-t-butylphenylamine, 9,10-di-n-butoxyanthracene, and 4,4'-[1,10-dioxo-1,10-decanediilbis(oxy)]bis[2,2,6,6-tetramethyl]-1-piperidinyloxy. These polymerization inhibitors may be used alone or in combination.

As the polymerization inhibitor, commercially available products can be used. Examples of the commercially available products include Trade Name: METHOQUINONE (4-methoxyphenol, manufactured by Seiko Chemical Co., Ltd.), Trade Name: MNT (4-methoxy-1-naphthol, manufactured by KAWASAKI KASEI CHEMICALS LTD.), Trade Name: HYDROQUINONE (p-hydroxyphenol, manufactured by Seiko Chemical Co., Ltd.), Trade Name: MH (methylhydroquinone, manufactured by Seiko Chemical Co., Ltd.), and Trade Name: NONFLEX Alba (2,5-di-tert-butylhydroquinone, manufactured by Seiko Chemical Co., Ltd.). These commercially available products may be used alone or in combination.

The proportion of the polymerization inhibitor is preferably $0.01 \times A$ % by mass or more when the proportion of the polymerization initiator is taken as A % by mass.

<Preparation of Active Energy Ray-Curable Composition>

The active energy ray-curable composition according to an embodiment of the present invention can be prepared using the aforementioned various components. Devices and conditions for preparation are not particularly limited, but for example, the active energy ray-curable composition can be prepared by a process that a polymerizable monomer, a pigment, a dispersant, and the like are subjected to a dispersing machine such as a ball mill, a kitty mill, a disk mill, a pin mill, and a DYNO-MILL, and dispersed to prepare a pigment liquid dispersion, and further a polymerizable monomer, an initiator, a polymerization inhibitor, a surfactant, and the like are mixed in the pigment liquid dispersion.

<Viscosity>

A viscosity of the active energy ray-curable composition according to an embodiment of the present invention may be appropriately adjusted depending on applications and applied devices, and is not particularly limited. For example, when applying a discharge device for discharging the composition from a nozzle, a viscosity at 20° C. to 65° C., desirably a viscosity at 25° C. is preferably 3 to 40 mPa·s, more preferably 5 to 15 mPa·s, and particularly preferably 6 to 12 mPa·s. It is particularly preferable that the viscosity range is satisfied under a condition in which the composition does not contain the aforementioned organic solvent. Incidentally, the viscosity can be measured by means of a cone-plate-type rotary viscometer VISCOMETER TVE-22L manufactured by TOKI SANGYO CO., LTD. using a cone rotor (1°34'×R24) at a rotation speed of 50 rpm, while a temperature of a constant temperature circulating water is appropriately set within a range of 20° C. to 65° C. For adjusting the temperature of the circulating water, VISCOMATE VM-150 III can be used.

The active energy ray-curable composition according to an embodiment of the present invention is characterized in that an absorbance at 700 nm of a supernatant obtained by centrifuging the composition with a centrifugal force of $8 \times 10^6$ g is 0.02 or lower. Centrifugation conditions are as follows.

Centrifuge: Centrifuge CP-100MX manufactured by Hitachi Koki Co., Ltd.

Rotation speed: 70,000 rpm

Centrifugal force: $8 \times 10^6$ g

Centrifugation time: 30 minutes

The absorbance at a wavelength of 700 nm was measured using an absorption spectrometer U-3900H manufactured by Hitachi High-Technologies Corporation.

The reason for measuring the absorbance at 700 nm as described above is because presence of impurities is confirmed at high sensitivity. When the absorbance is 0.02 or lower, it means that there are few impurities, and the effect of the present invention can be enhanced.

In addition, in analyzing the supernatant under the following gas chromatography conditions, it is preferable that the active energy ray-curable composition shows a peak of the isobornyl acrylate in a retention time of 15.8 minutes and a peak of an impurity in a retention time of 15.5 minutes, and the ratio of a peak area of the impurity to a peak area of the isobornyl acrylate is 2.6% or lower.

Gas Chromatography Conditions

Measuring instrument: GC2014 manufactured by Shimadzu Corporation

Analysis column: ZB-WAX, length=30 m, inner diameter=0.25 mm, film thickness=0.25 µm Column temperature: 40° C. (retention time: 5 minutes), then elevated by 20° C./min to 250° C. (retention time: 3 minutes)

Vaporization chamber temperature: 250° C.

Detector: a flame ionization detector (FID)

Carrier gas: helium gas

Carrier gas flow rate: 1.0 ml/min

Solvent: dimethylformamide

Figure 4:
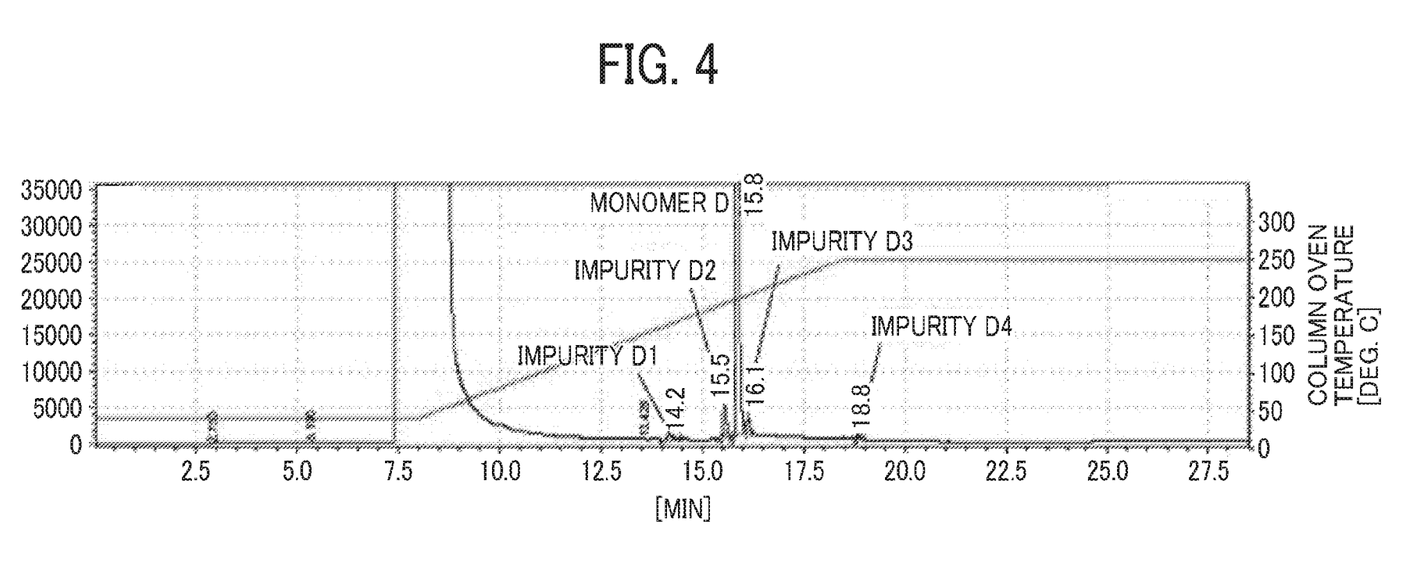
FIG. 4 is a gas chromatograph of an active energy ray-curable composition according to an embodiment of the present invention.

When a peak area ratio of the impurity is 2.6% or lower, the discharge stability can be further improved. Incidentally, a more preferable peak area ratio of the impurity is 2.5% or lower. FIG. 4 illustrates an example of a gas chromatograph for the supernatant under the above gas chromatography conditions. FIG. 4 presents the peak of isobornyl acrylate (monomer D) in a retention time of 15.8 minutes, as well as peaks of impurities D1, D2, D3, and D4. From the study of the inventors of the present invention, it was found that the aforementioned effects of the present invention are achieved particularly by controlling the peak area ratio of the impurity D2 in a retention time of 15.5 minutes to be of a specified value or lower. The details of FIG. 4 are summarized in Table 1.

TABLE 1

|  | Retention time (min) | Peak Area | Area ratio (%) |
|---|---|---|---|
| IMPURITY D1 | 14.2 | 7412 | 0.7 |
| IMPURITY D2 | 15.5 | 24765 | 2.4 |
| MONOMER D | 15.8 | 974897 | 95.7 |
| IMPURITY D3 | 16.1 | 8845 | 0.9 |
| IMPURITY D4 | 18.8 | 3129 | 0.3 |
| Total | — | 1019048 | 100.0 |

<Applications>

Applications of the active energy ray-curable composition according to an embodiment of the present invention are not particularly limited as long as the applications belong to a field where active energy ray-curable materials are generally used. An appropriate application can be selected depending on the intended purpose, and exemplary applications include a molding resin, a paint, an adhesive, an insulating material, a mold lubricant, a coating material, a sealing material, various resists, and various optical materials.

Figure 2:
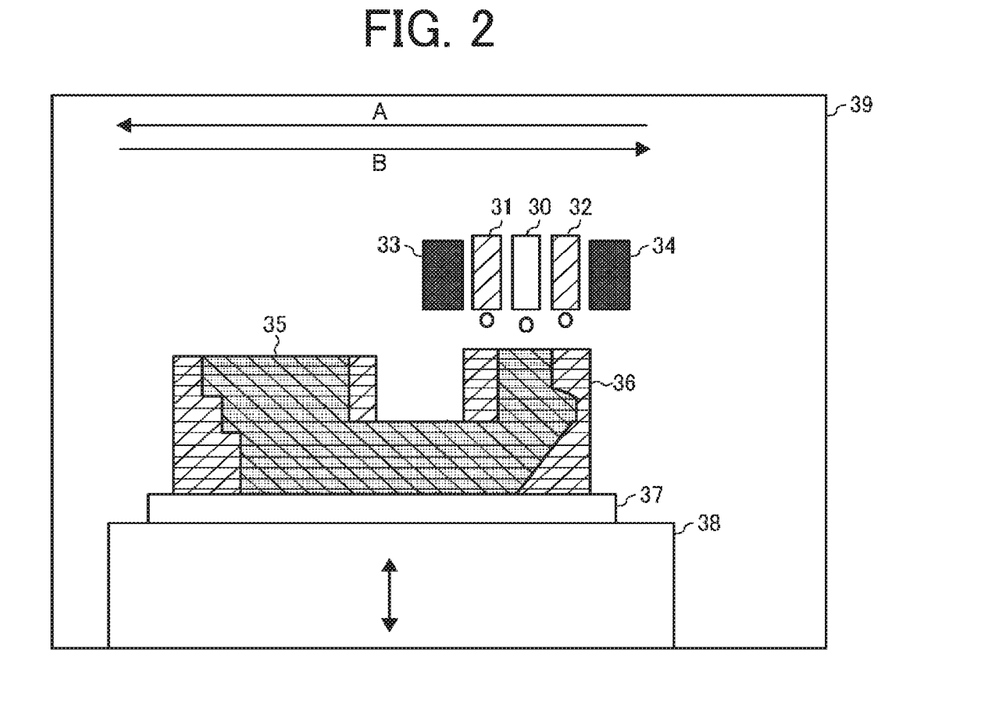
FIG. 2 is a schematic diagram illustrating an image forming apparatus according to an embodiment of the present invention.
Figure 3A:
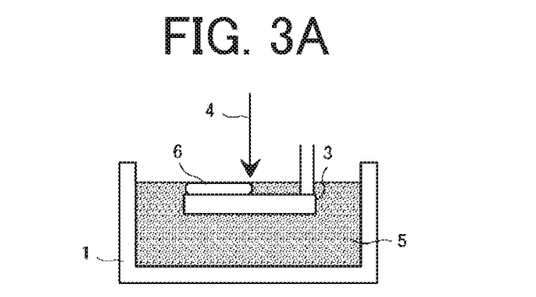
FIGS. 3A to 3D are schematic diagrams illustrating an image forming apparatus according to an embodiment of the present invention.
Figure 3B:
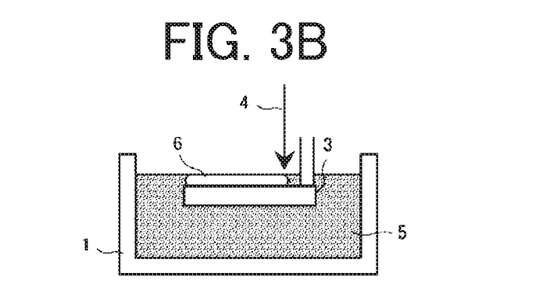
Figure 3C:
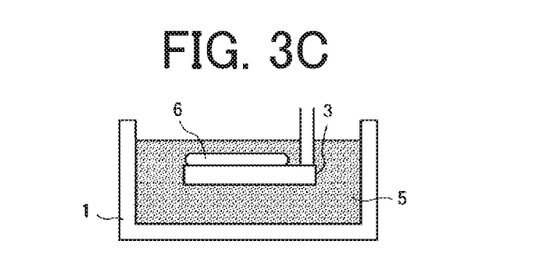
Figure 3D:
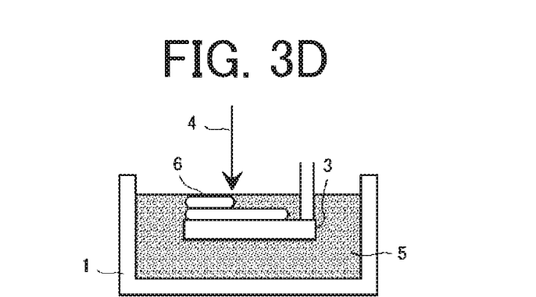

Furthermore, the active energy ray-curable composition according to an embodiment of the present invention can be used not only as ink for forming two-dimensional texts and images, and designed coating films on various substrates, but also as a solid object forming material for forming three-dimensional objects (solid objects). This solid object forming material may be used as a binder between powder particles used in a powder laminating method for forming a solid object by repeatedly curing and laminating a powder layer, or as a solid object constituent material (model material) or a supporting member (support material) used in an additive manufacturing method (stereolithography method) as illustrated in FIG. 2 and FIGS. 3A to 3D. Incidentally, FIG. 2 presents a method in which the active energy ray-curable composition according to an embodiment of the present invention is discharged to a predetermined area, and cured by irradiation with an active energy ray, these cured products are sequentially laminated to form a solid object (details will be explained later), and FIGS. 3A to 3D present a method in which a storage pool (storage unit) 1 for an active energy ray-curable composition 5 according to an embodiment of the present invention is irradiated with an active energy ray 4 to form a cured layer 6 having a predetermined shape on a movable stage 3, and the cured layers 6 are sequentially laminated to form a solid object.

As an apparatus for fabricating a solid object using the active energy ray-curable composition according to an embodiment of the present invention, a known apparatus can be used. The apparatus is not particularly limited, and examples of the apparatus include an apparatus including a storing device, a supplying device, and a discharging device of the composition, as well as an active energy ray irradiator, and the like.

In addition, the present invention includes a cured product obtained by curing the active energy ray-curable composition, and a formed article obtained by processing a structure in which the cured product is formed on a substrate. The formed article is obtained by subjecting the cured product or structure in a sheet shape, a film shape or the like to processing such as heat drawing or punching. For example, the formed article is suitably used for applications such as a meter, an operation panel or the like of an automobile, an OA device, an electric/electronic device, a camera or the like, which should be formed after surface decoration.

The substrate is not particularly limited, and can be appropriately selected according to the intended purpose. Examples of the substrate include paper, thread, fiber, cloth, leather, metal, plastic, glass, wood, ceramics, or a composite material thereof. From the viewpoint of processability, the plastic substrate is preferable.

<Composition Storage Container>

The composition storage container according to the present invention means a container storing the active energy ray-curable composition, and is suitable for the above applications. For example, if the active energy ray-curable composition according to an embodiment of the present invention is to be used for ink, the container storing the ink can be used as an ink cartridge or an ink bottle, thereby it is not required to directly touch the ink during operations such as ink transportation and ink replacement, and dirt on fingers and clothing can be prevented. In addition, contamination of the ink with foreign matters such as dusts can be prevented. It is sufficient that a shape, a size, a material, and the like of the container itself are suitable for the application and usage method. Although the material is not particularly limited, it is preferable that the material is a light-shielding material not transmitting light, or the container is covered with a light-shielding sheet or the like.

<Inkjet Discharging Apparatus>

An inkjet discharging apparatus according to an embodiment of the present invention characteristically includes the composition storage container as above. Specific examples of the inkjet discharging apparatus include an inkjet discharging apparatus including: an ink discharging unit to discharge the active energy ray-curable composition according to an embodiment of the present invention or an active energy ray-curable inkjet ink containing the composition onto a surface of a substrate by an inkjet recording method; and a curing unit that irradiates the active energy ray-curable composition or the active energy ray-curable inkjet ink discharged onto the surface of the substrate with an active energy ray to cure the composition or the ink. Hereinafter, the apparatus will be explained with reference to specific examples.

<Image Forming Method and Image Forming Apparatus>

In the image forming method according to an embodiment of the present invention, an active energy ray, heating, and the like can be used.

For curing the curable composition according to an embodiment of the present invention with the active energy ray, the curing process includes an irradiation process with the active energy ray. The image forming apparatus according to an embodiment of the present invention includes an irradiator for emitting the active energy ray and a storage unit for storing the active energy ray-curable composition according to an embodiment of the present invention. The above-described container may be arranged in the storage unit. Furthermore, a process and a device for discharging the active energy ray-curable composition may be included. The discharge method is not particularly limited, but a continuous injection type method, an on-demand type method, or the like is used. Examples of the on-demand type method include a piezo method, a thermal method, and an electrostatic method.

Figure 1:
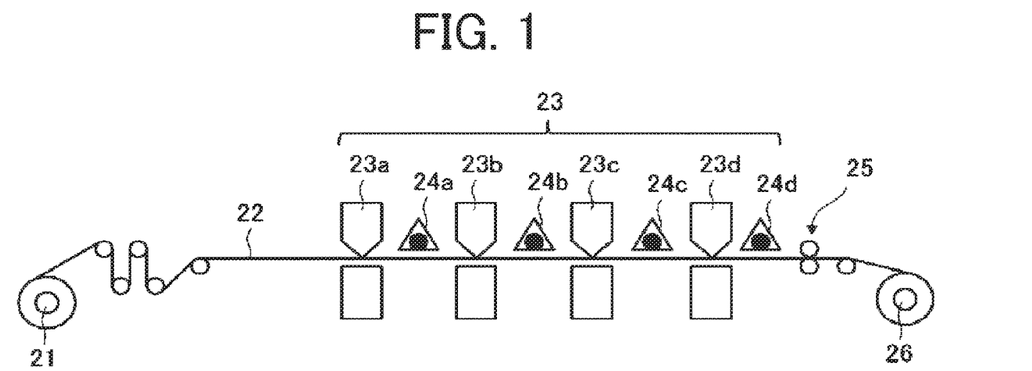
FIG. 1 is a schematic diagram illustrating an image forming apparatus according to an embodiment of the present invention.

FIG. 1 illustrates an example of the image forming apparatus including the inkjet discharging device. Each color printing unit 23a, 23b, 23c, or 23d including an ink cartridge for each color active energy ray-curable ink of yellow, magenta, cyan, or black and a discharging head discharges the ink to a recording medium 22 supplied from a supply roll 21. Then, the ink is cured by irradiating the ink with an active energy ray from a light source 24a, 24b, 24c, or 24d for curing the ink, to form a color image. Subsequently, the recording medium 22 is conveyed to a processing unit 25 and a printed matter winding roll 26. Each printing unit 23a, 23b, 23c, or 23d may include a heating mechanism such that the ink liquefies on an ink discharging part. In addition, a mechanism for cooling a recording medium to approximately room temperature in a contact/non-contact manner may be installed if required. Furthermore, as the inkjet recording method, it is possible to use both a serial method in which a head is moved relative to a recording medium capable of intermittently moving depending on a width of a discharging head to discharge ink onto the recording medium, and a line method in which a recording medium is continuously moved, and ink is discharged onto the recording medium from a head held in a certain position.

The recording medium 22 is not particularly limited, but examples of the recording medium 22 may include paper, film, ceramics, glass, metal, and a composite material thereof. The recording medium 22 may be formed into a sheet shape. In addition, the recording medium 22 may have either a configuration capable of one-side printing alone or a configuration capable of both-side printing. Not only materials used as general recording media but also cardboard, building materials such as wallpaper and floor material, concrete, fabric for a clothing such as a T-shirt, textile, leather, and the like can be used as appropriate.

Furthermore, the active energy ray may be emitted from the light source 24d after the active energy ray radiation from the light source 24a, 24b, or 24c is weakened or omitted and the plurality of colors are printed. Thereby, energy saving and low cost can be achieved.

Examples of the recorded matter recorded with the ink according to an embodiment of the present invention include printed smooth surfaces such as normal paper and resin film, as well as printed rugged surfaces, and printed surfaces including various materials such as metal and ceramic. In addition, an image partially having a three-dimensional effect (two-dimensional and three-dimensional image) and a solid matter can be formed by laminating two-dimensional images.

FIG. 2 is a schematic diagram illustrating an example of another image forming apparatus (three-dimensional object forming apparatus) according to an embodiment of the present invention. In the image forming apparatus 39 in FIG. 2, a head unit (movable in AB direction) having arranged inkjet heads is used, a first active energy ray-curable composition is discharged from an object discharge head unit 30, a second active energy ray-curable composition having a different composition from that of the first active energy ray-curable composition is discharged from support discharge head units 31 and 32, and each of these compositions are laminated while curing with adjacent ultraviolet irradiators 33 and 34. More specifically, for example, the second active energy ray-curable composition is discharged onto an object supporting substrate 37 from the support discharge head units 31 and 32, and solidified by active energy ray irradiation to form a first support layer having a reservoir. Then the first active energy ray-curable composition is discharged onto the reservoir from the object discharge head unit 30, and solidified by active energy ray irradiation to form a first object layer. This process is repeated multiple times in accordance with the number of laminations while lowering a vertically-movable stage 38, so that the support layer and the object layer are laminated, to produce a solid object 35. Subsequently, a support laminating portion 36 is removed if required. In FIG. 2, although just one object discharge head unit 30 is illustrated, two or more object discharge head units 30 can be installed.

EXAMPLES

Hereinafter, the present invention will be more specifically explained with reference to Examples and Comparative Examples. However, the present invention should not be construed to be limited to Examples and Comparative Examples.

Note that, in the following examples, the term "parts" means "parts by mass", and "%" means "% by mass".

Preparation Example 1: Preparation of Cyan Particle Liquid Dispersion (A)

To prepare a cyan particle liquid dispersion (A) (cyan solid content: 18%), 39.5 parts of phenoxyethyl acrylate manufactured by OSAKA ORGANIC CHEMICAL INDUSTRY LTD., 1.5 parts of polymer pigment dispersant "DISPERBYK-168" manufactured by BYK Additives & Instruments GmbH, 9.0 parts of cyan pigment "LIONOL BLUE FG-7330" manufactured by TOYOCOLOR CO., LTD. were blended, and stirred and mixed by a stirrer for one hour, and then stirred by a bead mill for two hours.

Preparation Example 2: Preparation of Magenta Particle Liquid Dispersion (B)

To prepare a magenta particle liquid dispersion (B) (magenta solid content: 12%), 42.2 parts of phenoxyethyl acrylate manufactured by OSAKA ORGANIC CHEMICAL INDUSTRY LTD., 1.8 parts of polymer pigment dispersant "DISPERBYK-168" manufactured by BYK Additives & Instruments GmbH, 6.0 parts of magenta pigment "Cinquasia Pink K4410" manufactured by BASF SE were blended, and stirred and mixed by a stirrer for one hour, and then stirred by a bead mill for two hours.

Preparation Example 3: Preparation of Yellow Particle Liquid Dispersion (C)

To prepare a yellow particle liquid dispersion (C) (yellow solid content: 12%), 42.5 parts of phenoxyethyl acrylate manufactured by OSAKA ORGANIC CHEMICAL INDUSTRY LTD., 2.8 parts of polymer pigment dispersant "DISPERBYK-168" manufactured by BYK Additives & Instruments GmbH, 6.0 parts of yellow pigment "Pigment Yellow 155" manufactured by Clariant AG were blended, and stirred and mixed by a stirrer for one hour, and then stirred by a bead mill for two hours.

Preparation Example 4: Preparation of Black Particle Liquid Dispersion (D)

To prepare a black particle liquid dispersion (D) (black solid content: 18%), 37.5 parts of phenoxyethyl acrylate manufactured by OSAKA ORGANIC CHEMICAL INDUSTRY LTD., 3.5 parts of polymer pigment dispersant "Solsperse 39000" manufactured by Lubrizol Corporation, 9.0 parts of black pigment "MA11" manufactured by Mitsubishi Chemical Corporation were blended, and stirred and mixed by a stirrer for one hour, and then stirred by a bead mill for two hours.

Preparation Example 5: Preparation of White Particle Liquid Dispersion (E)

To prepare a white particle liquid dispersion (E) (white solid content: 40%), 29 parts of phenoxyethyl acrylate manufactured by OSAKA ORGANIC CHEMICAL INDUSTRY LTD., 0.6 parts of polymer pigment dispersant "Solsperse 24000 GR" manufactured by Lubrizol Corporation, 0.4 parts of polymer pigment dispersant "AJISPER PB881" manufactured by Ajinomoto Fine-Techno Co., Inc., 20.0 parts of titanium oxide ("Titanics JR-301" manufactured by TAYCA CORPORATION, silica residual amount: 3% by mass, alumina residual amount: 1% by mass) were blended, and stirred and mixed by a stirrer for one hour, and then stirred by a bead mill for two hours.

Examples 1 to 11 and Comparative Examples 1 to 5

The materials (parts by mass) presented in Table 2 were sequentially blended while stirring, and then further stirred for 2 hours to prepare active energy ray-curable compositions of Examples 1 to 11 and Comparative Examples 1 to 5.

The materials used in Examples and Comparative Examples in Table 2 are as follows.
(Monofunctional Monomer)
  Isobornyl acrylate A (manufactured by Anhui Jixi Tianchi Chemical Co., Ltd.)
  Isobornyl acrylate B (manufactured by OSAKA ORGANIC CHEMICAL INDUSTRY LTD.)
  Acryloylmorpholine (manufactured by Kohjin Co., Ltd.)
  Phenoxyethyl acrylate (manufactured by OSAKA ORGANIC CHEMICAL INDUSTRY LTD.)
  Cyclic trimethylolpropaneformal acrylate (manufactured by OSAKA ORGANIC CHEMICAL INDUSTRY LTD.)
(Bifunctional Monomer)
  Tricyclodecanedimethylol diacrylate (manufactured by Nippon Kayaku Co., Ltd.)
(Oligomer)
  CN966 (urethane acrylate, manufactured by Sartomer Company, Inc.)
  CN963J85 (urethane acrylate, manufactured by Sartomer Company, Inc.) (Polymerization Inhibitor)
  4-methoxyphenol: METHOQUINONE (manufactured by Seiko Chemical Co., Ltd.)
(Polymerization Initiator)
  Bis(2,4,6-trimethylbenzoyl)-phenylphosphine oxide: DIADO UV-CURE 819 (manufactured by DAIDO CHEMICAL CORPORATION)
  2,4,6-trimethylbenzoyldiphenylphosphine oxide: DAIDO UV-CURE TPO (manufactured by DAIDO CHEMICAL CORPORATION)
  Irg 369: Irgacure 369
  2,4-diethylthioxanthone: KAYACURE-DETX (manufactured by DAIDO CHEMICAL CORPORATION)
  Benzoxazole derivative: Telalux KCB p (manufactured by Clariant Japan K. K.)
(Surfactant)
  Polyether-modified siloxane: TEGO WET270 (manufactured by Evonik Japan)
[Evaluation of Physical Properties]
The active energy ray-curable compositions obtained in Examples 1 to 11 and Comparative Examples 1 to 5 were evaluated for absorbance, impurities, discharge stability, image quality, curability and adhesiveness by the following evaluation methods.
<Absorbance>
The obtained active energy ray-curable composition was centrifuged under the following centrifugation conditions, and for an obtained supernatant, an absorbance at a wavelength of 700 nm was measured using an absorption spectrometer U-3900H manufactured by Hitachi High-Tech Science Corporation.
  Centrifuge: Centrifuge CP-100MX manufactured by Hitachi Koki Co., Ltd.
  Rotation speed: 70,000 rpm
  Centrifugal force: $8 \times 10^6$ g
  Centrifugation time: 30 minutes
<Measurement of Impurities>
The isobornyl acrylate used and contained in the obtained supernatant showed a peak in a retention time of 15.8 minutes under the following gas chromatography conditions. In addition, an impurity showed a peak in a retention time of 15.5 minutes under the same gas chromatography conditions.

The ratio of a peak area of the impurity to a peak area of the isobornyl acrylate A (Anhui Jixi Tianchi Chemical Co., Ltd.) was 2.5%, the ratio of the peak area of the impurity to a peak area of the isobornyl acrylate B (OSAKA ORGANIC CHEMICAL INDUSTRY LTD.) was 2.7%.
  Gas Chromatography Conditions
  Measuring instrument: GC2014 manufactured by Shimadzu Corporation
  Analysis column: ZB-WAX, length=30 m, inner diameter=0.25 mm, film thickness=0.25 µm
  Column temperature: 40° C. (retention time: 5 minutes), then elevated by 20° C./min to 250° C. (retention time: 3 minutes)
  Vaporization chamber temperature: 250° C.
  Detector: FID
  Carrier gas: helium gas
  Carrier gas flow rate: 1.0 ml/min
  Solvent: dimethylformamide
<Discharge Stability>
The active energy ray-curable compositions of Examples 1 to 11 and Comparative Examples 1 to 5 were subjected to continuous 100-sheet printing using an inkjet discharging apparatus equipped with GEN 5 head (manufactured by RICOH PRINTING SYSTEMS, LTD.) with a resolution of 600 dpi at one-pass printing in a single-pass printing method, and discharge turbulence state and undischarge state were evaluated according to the following criteria.
[Evaluation Criteria]
Excellent: No discharge turbulence and no undischarge
Good: Discharge turbulence and undischarge at 10 nozzles or less
Medium: Discharge turbulence and undischarge at 30 nozzles or less
Poor: Discharge turbulence and undischarge at 50 nozzles or more
<Curability>
The active energy ray-curable compositions of Examples 1 to 11 and Comparative Examples 1 to 5 were applied on a polycarbonate substrate (Iupilon 100FE2000 masking, manufactured by Mitsubishi Engineering-Plastics Corporation, thickness: 100 µm) using the inkjet discharging apparatus equipped with GEN5 head (manufactured by RICOH PRINTING SYSTEMS, LTD.) in the single-pass printing method, to obtain a solid coating film having a thickness of about 12 µm. The coating film was cured by irradiation with an active energy ray with an integrated light quantity of 500 mJ/cm$^2$ at a long wavelength of 395 nm by a LED UV irradiator LH6 manufactured by Fusion Systems Japan Co., Ltd., to obtain a cured product.

Then, the obtained coating surface was evaluated by palpation using a cotton swab according to the following criteria.

[Evaluation Criteria]

Excellent: coating surface has no scratch.

Good: coating surface has no scratch but has slight stickiness, however, has no practical problem.

Medium: coating surface has slight scratch and stickiness.

Poor: coating surface has scratch and a part of the cured film is transferred to hands.

<Adhesiveness>

The cured product obtained above was measured for adhesiveness in accordance with the JIS K5400 cross-cut test (old standard) and evaluated according to the following criteria. Note that, in relation to numerical values of adhesiveness, a surface having no peeling grids among 100 grids is defined as "adhesiveness 100", and "adhesiveness 80" means a surface having 80% of non-peeling grids.

[Evaluation Criteria]

Excellent: adhesiveness is rated as 100, and there is almost no peeling on the cut lines.

Good: adhesiveness is rated as 98 or higher, or there is slight peeling on the cut lines but no practical problem.

Medium: adhesiveness is rated as 50 or higher and lower than 98.

Poor: adhesiveness is rated as lower than 50.

The results are presented in Table 2.

TABLE 2

| Sort | Compound Name | Example 1 | Example 2 | Example 3 | Example 4 | Example 5 | Example 6 | Example 7 | Example 8 |
|---|---|---|---|---|---|---|---|---|---|
| Monofunctional monomer | Isobornyl acrylate A | 20 | 12.5 | 30 | 27.6 | 20 | 20 | 1 | 5 |
| | Isobornyl acrylate B | | | | | | | | |
| | Acryloyl morpholine | 5 | 5 | 5 | 5 | 5 | 5 | 5 | 5 |
| | Phenoxyethyl acrylate | 36.8 | 34.3 | 26.8 | 19.3 | 36.8 | 36.8 | 30 | 18.1 |
| | Cyclic trimethylolpropaneformal acrylate | | 10 | | 5 | | | 17.5 | 20 |
| Bifunctional Monomer | Tricyclodecanedimethylol diacrylate | 4 | 4 | 4 | 4 | 4 | 4 | 4 | 5 |
| Oligomer | CN966 | 9 | 9 | 9 | 9 | | 4 | 2 | 3.2 |
| | CN963J85 | | | | | 9 | 5 | | |
| Polymerization inhibitor | 4-methoxyphenol | 0.2 | 0.2 | 0.2 | 0.2 | 0.2 | 0.2 | 0.2 | 0.2 |
| Initiator | Bis(2,4,6-trimethylbenzoyl)-phenylphosphine oxide | 0.1 | 0.1 | 0.1 | 5 | 0.1 | 0.1 | 1 | 0.5 |
| | 2,4,6-trimethylbenzoyldiphenyl phosphine oxide | 10 | 10 | 10 | 10 | 10 | 10 | 5 | 12 |
| | Irg369 | | | | | | | | |
| | 2,4-diethylthioxanthone | 1 | 1 | 1 | 1 | 1 | 1 | 1 | 1 |
| | Telalux KCB p | | | | | | | | |
| Liquid dispersion | Cyan particle liquid dispersion | 13.9 | 13.9 | 13.9 | 13.9 | 13.9 | 13.9 | | |
| | Magenta particle liquid dispersion | | | | | | | 33.3 | |
| | Yellow particle liquid dispersion | | | | | | | | 30 |
| | Black particle liquid dispersion | | | | | | | | |
| | White particle liquid dispersion | | | | | | | | |
| Surfactant | TEGO WET270 | | | | | | | | |
| Total | | 100 | 100 | 100 | 100 | 100 | 100 | 100 | 100 |
| Discharge stability | | Excellent | Excellent | Good | Good | Excellent | Excellent | Excellent | Excellent |
| Adhesiveness | | Excellent | Good | Excellent | Excellent | Excellent | Excellent | Excellent | Excellent |
| Curability | | Good | Good | Good | Excellent | Good | Good | Good | Good |
| Absorbance | | 0.01 | 0.01 | 0.02 | 0.02 | 0.01 | 0.01 | 0.01 | 0.01 |

| Sort | Compound Name | Example 9 | Example 10 | Example 11 | Comparative Example 1 | Comparative Example 2 | Comparative Example 3 | Comparative Example 4 | Comparative Example 5 |
|---|---|---|---|---|---|---|---|---|---|
| Monofunctional monomer | Isobornyl acrylate A | 5 | 20 | 20 | | | 20 | 20 | 20 |
| | Isobornyl acrylate B | | | | 20 | | | | |
| | Acryloyl morpholine | 3 | 3 | 5 | 5 | 7.5 | 7.5 | 5 | 5 |
| | Phenoxyethyl acrylate | 19 | 20.5 | 32 | 36.8 | 14.3 | 29.4 | 36.9 | 25.8 |
| | Cyclic trimethylolpropaneformal acrylate | 30 | | 26.5 | | 40 | | | |
| Bifunctional Monomer | Tricyclodecanedimethylol diacrylate | 4 | 4 | 2 | 4 | 4 | 4 | 4 | 4 |
| Oligomer | CN966 | 3 | 5 | 5 | 9 | 9 | 9 | 9 | 20 |
| | CN963J85 | | | | | | | | |
| Polymerization inhibitor | 4-methoxyphenol | 0.2 | 0.2 | 0.2 | 0.2 | 0.2 | 0.2 | 0.2 | 0.2 |
| Initiator | Bis(2,4,6-trimethylbenzoyl)-phenylphosphine oxide | 0.1 | 1 | 1 | 0.1 | 0.1 | 15 | | 0.1 |
| | 2,4,6-trimethylbenzoyldiphenyl phosphine oxide | 16 | 5 | 8 | 10 | 10 | | | 10 |
| | Irg369 | | | | | | | 10 | |
| | 2,4-diethylthioxanthone | 3 | | | 1 | 1 | 1 | 1 | 1 |
| | Telalux KCB p | | | 0.2 | | | | | |

TABLE 2-continued

| | | | | | | | | | |
|---|---|---|---|---|---|---|---|---|---|
| Liquid dispersion | Cyan particle liquid dispersion | | | | 13.9 | 13.9 | 13.9 | 13.9 | 13.9 |
| | Magenta particle liquid dispersion | | | | | | | | |
| | Yellow particle liquid dispersion | | | | | | | | |
| | Black particle liquid dispersion | 16.7 | | | | | | | |
| | White particle liquid dispersion | | 41.3 | | | | | | |
| Surfactant | TEGO WET270 | | | 0.1 | | | | | |
| Total | | 100 | 100 | 100 | 100 | 100 | 100 | 100 | 100 |
| Discharge stability | | Excellent | Excellent | Excellent | Poor | Excellent | Poor | Poor | poor |
| Adhesiveness | | Excellent | Excellent | Excellent | Excellent | Poor | Excellent | Excellent | Excellent |
| Curability | | Good | Good | Good | Good | Good | Good | Poor | Good |
| Absorbance | | 0.01 | 0.01 | 0.01 | 0.05 | 0.01 | 0.05 | 0.05 | 0.05 |

The active energy ray-curable composition of each Example was confirmed to be excellent in image quality and, from the results in Table 2, excellent in discharge stability, adhesiveness, and curability.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An active energy ray-curable composition comprising:
   a polymerizable compound comprising isobornyl acrylate; and
   a polymerization initiator,
   wherein the active energy ray-curable composition gives, when centrifuged with a centrifugal force of $8 \times 10^6$, a supernatant with an absorbance at a wavelength of 700 nm of 0.02 or lower.

2. The active energy ray-curable composition according to claim 1, wherein, when the supernatant is analyzed under gas chromatography conditions, in which: an analysis column with a length of 30 m, an inner diameter of 0.25 and a film thickness of 0.25 μm; a column temperature is set at 40° C.(retention time, 5 minutes), then elevated by 20° C./min to 250° C. (retention time, 3 minutes); a vaporization chamber temperature is 250° C.; a detector is a flame ionization detector; a carrier gas is helium gas; a carrier gas flow rate is 1.0 ml/min and a solvent is dimethylformamide,
   a peak of the isobornyl acrylate appears in a retention time of 15.8 minutes and a peak of an impurity appears in a retention time of 15.5 minutes, and a ratio of a peak area of the impurity to a peak area of the isobornyl acrylate is 2.6% or lower.

3. The active energy ray-curable composition according to claim 1, wherein a proportion of the isobornyl acrylate in the active energy ray-curable composition is 1% to 30% by mass.

4. The active energy ray-curable composition according to claim 1, wherein the polymerization initiator comprises an acylphosphine oxide compound.

5. The active energy ray-curable composition according to claim 1, wherein the polymerization initiator comprises phenyl bis (2,4,6-trimethylbenzoyl) phosphine oxide.

6. The active ray-curable composition according to claim 1, wherein a proportion of the polymerization initiator in the active energy ray-curable composition is 0.1% to 5% by mass.

7. An active energy ray-curable inkjet ink comprising the active energy ray-curable composition according to claim 1.

8. The active energy ray-curable inkjet ink according to claim 7, further comprising a polymerization inhibitor.

9. A composition storage container comprising:
   a container; and
   the active energy ray-curable composition according to claim 1 stored in the container.

10. An inkjet discharging apparatus comprising the composition storage container according to claim 9.

11. An inkjet discharging apparatus, comprising:
   an ink discharging unit containing the active energy ray-curable composition according to claim 1, the ink discharging unit configured to discharge the active energy ray-curable composition onto a surface of a substrate by an inkjet recording method; and
   a curing unit configured to irradiate the active energy ray-curable composition discharged on the surface of the substrate with an active energy ray to cure the active energy ray-curable composition.

12. A cured product comprising the active energy ray-curable composition according to claim 1.

* * * * *